T. CIVITA & B. C. LEGHORN.
COMBINED RAKE, GRADER, AND SNOW SCRAPER.
APPLICATION FILED AUG. 12, 1913.
1,093,535.　　　　　　　　　　　　　Patented Apr. 14, 1914.
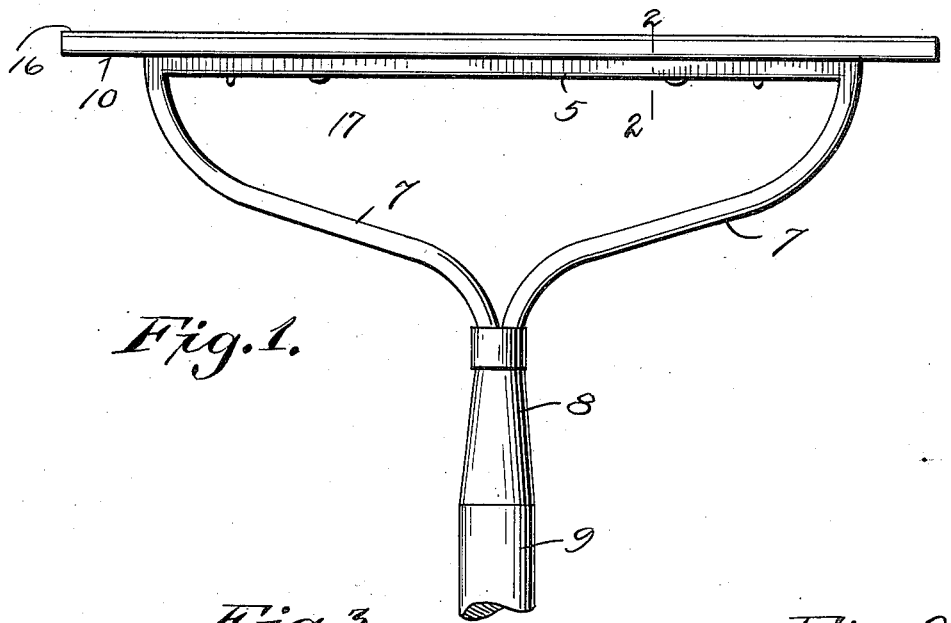
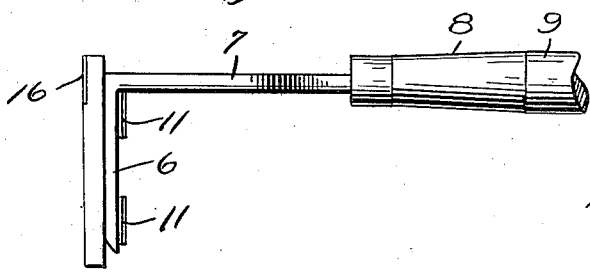
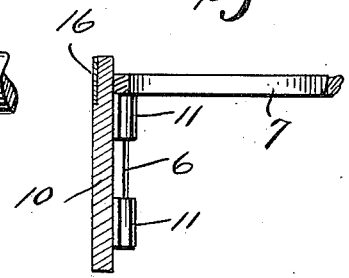
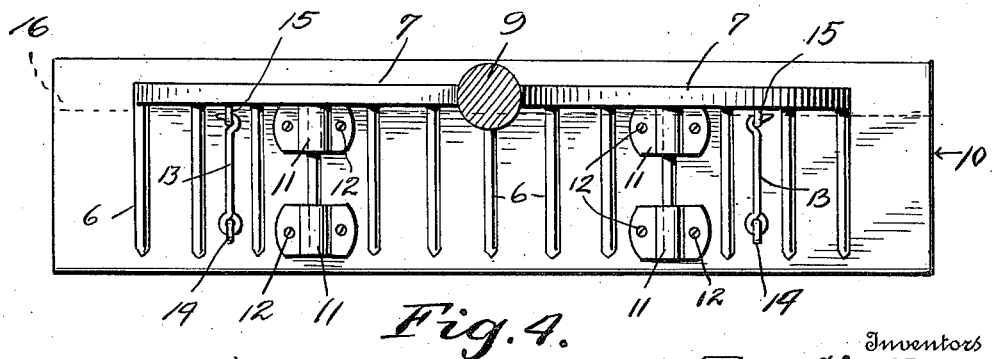
Witnesses　　　　　　　　　　Inventors
　　　　　　　　　　　　　and T. Civita
　　　　　　　　　　　　　B. C. Leghorn
　　　　　　　　　By
　　　　　　　　　　　　　Attorneys

UNITED STATES PATENT OFFICE.

TONY CIVITA AND BENJAMIN C. LEGHORN, OF ARLINGTON, OREGON.

COMBINED RAKE, GRADER, AND SNOW-SCRAPER.

1,093,535. Specification of Letters Patent. Patented Apr. 14, 1914.

Application filed August 12, 1913. Serial No. 784,460.

*To all whom it may concern:*

Be it known that we, TONY CIVITA and BENJAMIN C. LEGHORN, citizens of the United States, residing at Arlington, in the county of Gilliam, State of Oregon, have invented certain new and useful Improvements in Combined Rakes, Graders, and Snow-Scrapers; and we do hereby declare the following to be a full, clear, and exact description of the invention, such as will enable others skilled in the art to which it appertains to make and use the same.

This invention relates to new and useful improvements in combined rakes and ground levelers.

The object of the invention resides in the provision of a structure which when disassembled may be used as an ordinary rake and which when assembled is adapted for use as a ground leveler and as a scraper, and the invention further contemplates the provision of means whereby the rake teeth assist in holding the device in assembled relation.

A further object of the invention resides in the provision of a device of the class described which is easily and readily adjusted for its various uses, which is efficient in use and which is of such simple construction that it is durable in use, and may be manufactured at a comparatively low cost.

With these and other objects in view, the invention resides in the novel combination, formation and arrangement of parts to be more fully hereinafter described and illustrated in the accompanying drawings, particularly pointed out in the claim hereto appended.

Reference is had to the accompanying drawings wherein similar characters of reference designate corresponding parts throughout the several views, and in which:

Figure 1 is a top plan view of the improved device shown in assembled relation, Fig. 2 is a sectional view on the line 2—2 of Fig. 1, Fig. 3 is a side elevational view of the device, and Fig. 4 is a view of the device looking from the handle.

Referring now more particularly to the drawings, there is shown a rake comprising the head bar 5 from which depends a plurality of spaced straight rake teeth 6. Secured to the ends of the head bar are a pair of shank rods 7 which converge at their free ends and are secured to the usual socket 8 holding a handle 9.

When it is desired to use the device as a rake the structure above described only is employed.

The attachment which fits the rake structure for use as a grader or scraper comprises a plate 10 having disposed on one face thereof adjacent each end by means of the screws 12 a pair of plates 11 having their central portions bowed to form with the main plate 10 sockets disposed in vertical alinement for receiving adjacent rake teeth 6 and thus holding the grading plate with relation to the rake. The plate 10 is held from sliding off the rake teeth by hooks 13 pivotally secured to the plate at each end thereof by staples 14 and having their bills adapted to engage in eyes 15 carried by the head bar 5.

From the foregoing it is seen a structure has been provided whereby the plate 10 may be readily and quickly attached to the rake structure and efficiently held against undesired displacement.

To adapt this device for use as a scraper, as for scraping snow, a metallic plate 16 is secured to the upper edge of the plate 10.

From the foregoing it will be observed that a very simple structure has been provided which will efficiently perform the functions normally required thereof.

What is claimed is:

A combined structure of the class described comprising a rake head, spaced teeth depending therefrom, eyes carried by the rake head, a plate, members secured thereto and forming therewith sockets for receiving certain of the rake teeth, pivoted hooks carried by the plate and adapted to engage in the eyes to hold the plate with relation to the rake teeth and a scraper plate secured to the top edge of the first plate.

In testimony whereof, we affix our signatures, in the presence of two witnesses.

TONY CIVITA.
BENJAMIN C. LEGHORN.

Witnesses:
RALPH J. ERWIN,
CLAUD C. CLARK.

---

Copies of this patent may be obtained for five cents each, by addressing the "Commissioner of Patents, Washington, D. C."